Sept. 2, 1924.

W. M. JEWELL

METHOD OF LIQUEFYING GAS

Filed May 12, 1919

Witness:
Harry S. Gunther

Inventor:
William M. Jewell
by Dyrenforth, Lee, Chritton & Wiles
Attys.

Sept. 2, 1924.

W. M. JEWELL

METHOD OF LIQUEFYING GAS

Filed May 12, 1919     3 Sheets—Sheet 3

1,507,289

Patented Sept. 2, 1924.

1,507,289

UNITED STATES PATENT OFFICE.

WILLIAM M. JEWELL, OF CHICAGO, ILLINOIS, ASSIGNOR TO CHLORINE PRODUCTS COMPANY, OF CHICAGO, ILLINOIS, A CORPORATION OF ILLINOIS.

METHOD OF LIQUEFYING GAS.

Application filed May 12, 1919. Serial No. 296,460.

*To all whom it may concern:*

Be it known that I, WILLIAM M. JEWELL, a citizen of the United States, residing at Chicago, in the county of Cook and State of Illinois, have invented a new and useful Improvement in Methods of Liquefying Gas, of which the following is a specification.

The manufacture of chlorine gas, according to the methods hitherto practiced, involves what is known as mechanical refrigeration for reducing the temperature of the condensers for the compressed gas to a relatively low temperature, commonly in the neighborhood of 35° F. below zero, in order to avoid the compressing of the gas to very high pressure. Such methods also involve the subjection of the chlorine gas to chemicals to separate the gas from air, hydrogen and other gaseous ingredients it may contain, as by the use of a solvent such as carbon-tetra-chloride, and the subsequent distillation of the chlorine gas by steam, re-cooling, or chilling of the chlorine distillate, the recovery of the solvent for further use, or the use of slow-operating earthenware pumps or high entrainment towers for compressing the chlorine gas and auxiliary apparatus for absorbing the uncondensable portion of the chlorine with quick lime, or other suitable chemical, all of which results in complicated and expensive plants which are troublesome to maintain in proper working condition.

Furthermore, it has been the practice, owing to the fact that the liquid chlorine upon being discharged from the condenser is at a relatively low temperature, as, for example, 35° F. below zero, to employ a relatively large receiving tank into which the chlorine flows, and in which tank the liquefied chlorine is permitted to remain until the temperature thereof approximates the temperature of the atmosphere surrounding the tank, from which latter the shipping cylinders or containers are filled, this condition also causing the apparatus to be expensive of construction and expensive to operate, and rendering the operation of the apparatus intermittent.

My primary object is to so improve previous methods of compressing gases in general, and more particularly chlorine gas, that the gases may be liquefied at greatly reduced expense; and generally to render easier and less costly the production of substantially pure gas especially in the case of chlorine gas.

Referring to the accompanying drawings,—

Figure 1:
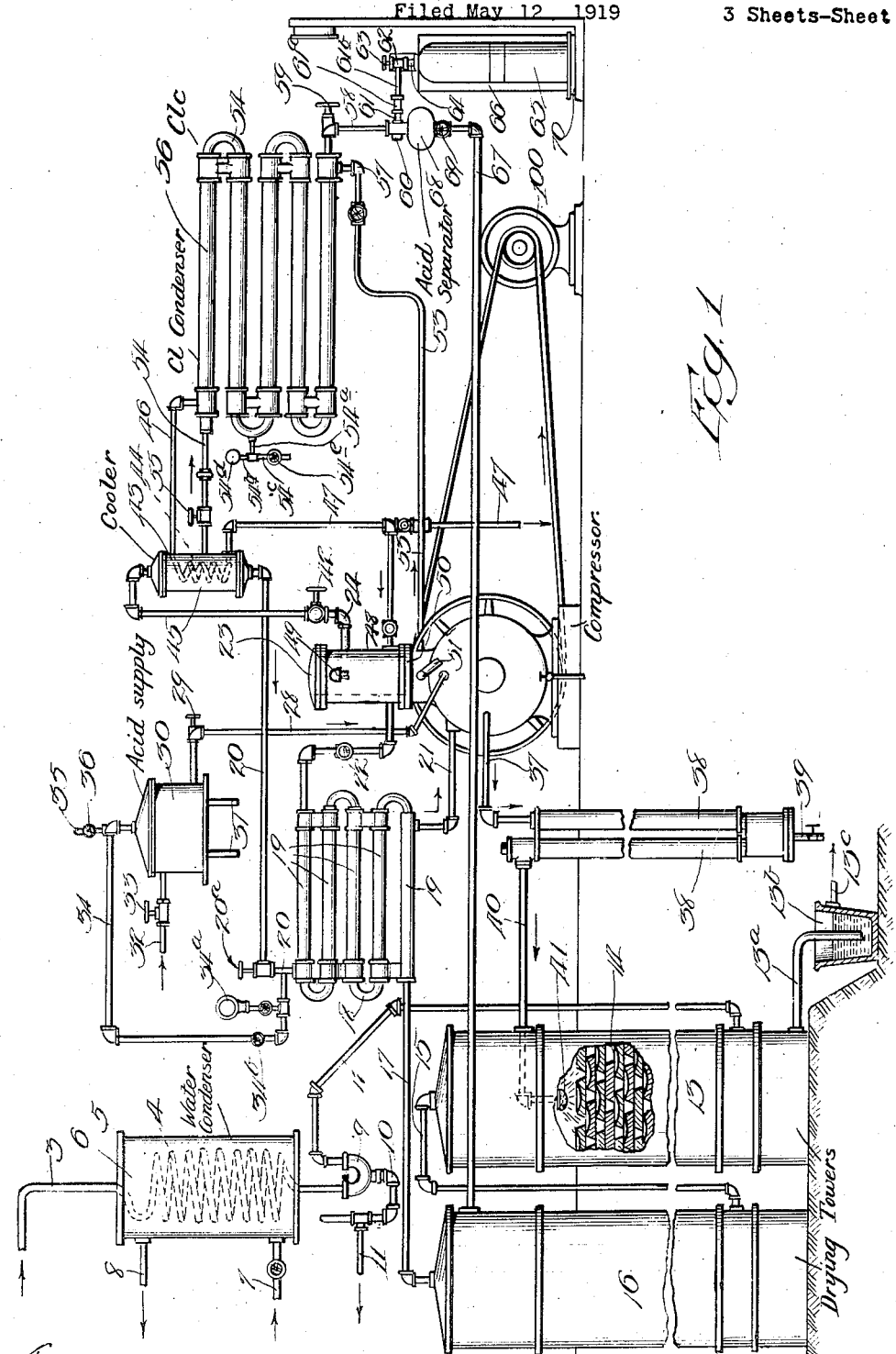
Figure 3:
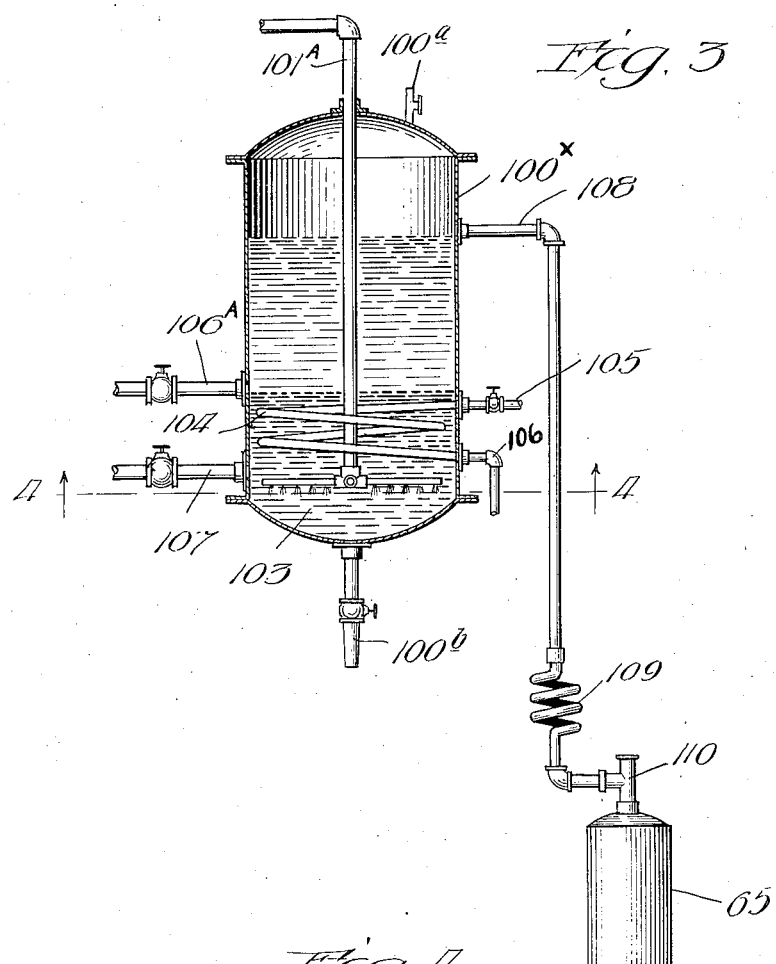

Figure 1 shows by a view, in the nature of a diagram, an apparatus suitable for practicing my improved method; Figure 2 is a perspective view of a gas compressor employed, with a portion of the crank case of the compressor broken away to disclose interior details; Figure 3 is a view like Fig. 1 of a variation in the portion of the apparatus shown in this figure; and Figure 4, a section taken at the line 4—4 on Fig. 3 and viewed in the direction of the arrow, with coil omitted.

Referring more particularly, to the apparatus disclosed in Figs. 1 and 2, a pipe, represented at 3, leads from the apparatus wherein the chlorine gas is produced, as, for example, from an electrolytic cell or cells (not shown) and which operate to produce electrolytic chlorine gas which commonly contains some non-condensable gas, this pipe connecting with the upper end of a coil 4 of a cooling apparatus 5, this coil being contained in a chamber 6 through which a cooling medium, as, for example, water, is circulated, the water entering the bottom of the tank 5 through the pipe 7 and discharging therefrom at its top through the pipe 8. The lower end of the coil 4 connects with a trap 9 in the form of a U-pipe communicating at its lowest portion with a pipe 10 through which condensable matter removed from the chlorine gas in the coil 4, is withdrawn through the outlet pipe 11. The trap 9 connects wtih a pipe 12 which opens into the bottom of a preliminary drying tower 13 which may be of any suitable construction, the same being shown as of the loose-packing type, as represented at 14, whereby the gas flowing into the drying tower is caused to pass in a zigzag course to the upper portion thereof from which it passes through a pipe 15 which connects with the lower end of another drying tower 16 which may be of the same general construction as described for the tower 13, the gas passing upwardly through the tower 16 and passing therefrom through a pipe 17 which connects with a coil 18. The coil 18 as shown is jacketed by the coil 19 having an inlet pipe 20 and an outlet pipe 21, this part of the apparatus being so constructed that chlorine gas with acid therein, as hereinafter explained, will pass through the coil 19 in a direction contrary to the flow of gas through the coil 18. The end of the coil 18 opposite that connected with the pipe 17 is provided with a valve 22 and connects with the inlet opening of the compressor represented at 23, a pipe 24 communicating with the outlet opening in the cylinder of the compressor for the compressed gas. The compressor 23 may be of any suitable type, that shown being a common and well-known construction of compressor of the reciprocating type, the crank case thereof being represented at 25 and in which the lower end of the connecting rod 26 of the compressor-piston operates, as shown in Fig. 2, the compressor shown being operated from the shaft 27, as by an electric motor 100 belted to a pulley 101 on the shaft 27. In the use of the compressor, its piston (not shown) is lubricated by means of comparatively dry sulphuric acid, the acid by preference being at least of 1.84 specific gravity at 66° Baumé 95% pure, and to accomplish this, the acid may be supplied to the interior of the crank-case 25 from which it becomes supplied to the piston for lubricating the latter in its movements in the cylinder, by the action of the connecting rod 26 and its connection with the crank shaft 27 operating as a "splash" feed. In the particular apparatus shown, the sulphuric acid is supplied to the crank-case 25 through a pipe 28, valved as indicated at 29, and connected with the lower end of a tank 30 shown as supported at 31 and communicating by a pipe 32, valved at 33, with a supply of sulphuric acid. The upper end of the tank 30 connects by a pipe 34 with the pipe 20, the pipe 34 adjacent the tank 30 having a branch 35 provided with a vent-valve 36 which is opened to permit the gas pressure in the chamber 30 to vent therefrom during the filling of this chamber with the acid. The crank-case 25 contains an outlet about midway between its top and bottom for the sulphuric acid which connects with a pipe 37 opening into a trap 38 having a valved drain-pipe 39, the opposite end of this trap communicating with a pipe 40 which opens into the drying tower 13 and terminates above the packing 14 therein, in a spray-head 41 for spraying sulphuric acid against the rising currents of chlorine gas passing upwardly through the tower. The compressor-outlet pipe 24 contains a valve 42 and opens into the upper end of a tank 43 of a cooling apparatus 45 the coil of which, for the cooling medium, and which is located in the tank 43, being represented at 44. A pipe 46 for cooling water supplied thereto, as hereinafter described, connects with the upper end of the coil 44 for causing cooling water to flow through the latter from which it discharges through a pipe 47 into the jacketed portion of the cylinder 48 of the compressor, the outlet of this jacketed portion being represented at 49 and opening into a sewer.

A pipe 51 leading from a supply (not shown) of cooling water connects with the upper end of a coil 52 which lies in the bottom of the crank-case 25, the outlet of this coil communicating with a pipe 53 which connects with a condenser hereinafter referred to.

The lower end of the tank 43 opens into the pipe 20 through which liquid chlorine with some of the sulphuric acid, passes for the purpose above stated.

The outlet of the tank 43 for this compressed chlorine gas connects with a pipe 54 valved, as indicated at 55, and formed into a coil as represented, this coil being surrounded by a coil 56 connected at its lower end with a valved water-inlet pipe 57 which connects with the pipe 53, the upper end of the coil 56 being connected with the pipe 46, the coils 54 and 56 forming a condenser in which the cooling water travels in a direction contrary to the flow of the gas. A pipe 54$^a$ preferably connects with the pipe 54 and has branch pipes 54$^b$ and 54$^c$, the pipe 54$^b$ being equipped with a gauge 54$^d$ and the pipe 54$^c$ which forms a vent-pipe, being equipped with a valve 54$^e$. A pipe 58 valved at 59 leads from the coil 54 to a T-coupling 60 one outlet of which connects with a pipe 61 connected by a flexible pipe 61$^a$ with a pipe 61$^b$ which terminates in a hollow head 62 with a valve 63, this head being connected with the inlet of a shipping container represented at 65, the container shown being such as are commonly used and holding about 100 pounds of liquid chlorine, the container being enclosed in heat-insulating material represented at 66 and shown as supported on a weighing scale 70. The other outlet of the T-coupling 60 connects with a pipe 67 having an enlargement 68 with a valve 69 below the enlargement, this pipe opening into the upper end of the drying tower 16 and terminating therein in a spray-head (not shown) for spraying sulphuric acid, separated in the chamber 68 from the liquid chlorine, into the chlorine gas as it passes upwardly through this tower.

In the operation of the apparatus as shown, the chlorine gas is drawn from the electrolytic cells hereinbefore referred to, by a slight vacuum preferably of about 1/8" to 1/4" of water, produced by the action of the compressor and regulated by the valve 22, the gas with its contained water-vapor, which is present to a considerable degree and which should be removed, passing through the pipe 3 into the coil 4 wherein it is subjected to the cooling action of the water flowing into the latter through the pipe 7 and flowing out by the pipe 8, wherein the larger part of the water vapor in the gas is condensed and separated from the gas in the trap 9, the water thus separated flowing off through the outlet-pipe 11. The gas thus partially freed of its contained moisture then flows into the drying tower 13 wherein further drying is effected by the rising currents of the gas contacting the packing 14 which is wetted by the discharge of acid against it, the acid being supplied through the spray-head 41 from the pipe 40, trap 38, pipe 37 and crank-case 25, the acid thus used being the acid which has passed through the compressor crank-case 25 and has overflowed therefrom under the action of the continuous feed of acid into the crank-case from the tank 30, the acid flowing from the tower 13 through a pipe 13$^a$ at its bottom and discharging into a receptacle 13$^b$ below its outlet 13$^c$ from which the spent acid flows to storage or waste. The gas then passes from the upper end of the drying tower 13 into the lower end of the drying tower 16 through which latter it upwardly passes in contact with the packing 14 wetted with a shower of sulphuric acid from the spray-head (not shown) but hereinbefore referred to and supplied with sulphuric acid from any suitable source, supplemented by sulphuric acid which passes into the pipe 67 from the separator-chamber 68, the moisture in the gas being reduced thereby to about 0.3 to 0.5 milligrams per liter, the final drying of the gas taking place in the tower 16. The gas then passes through the coil 18 where it is subjected to the cooling action of expanding chlorine gas which is supplied to the coil 19, to flow in a direction therethrough opposite to the flow of the gas through the coil 18, from the chamber 43 through the pipe 20. The gas in cooled condition then passes through the valved pipe 18 into the inlet of the compressor where it is compressed to about 100 pounds per square inch and in the compressing operation is commingled with sulphuric acid in finely divided condition and preferably partially vaporized, the acid being fed to the piston for lubricating it by the splash-feed action of the connecting-rod 26 operating in the crank-case 25 which contains sulphuric acid supplied thereto as stated. The compressed gas, together with some of the acid, commingled therewith as stated, discharges from the compressor through the valved pipe 24, and thence into the upper end of the tank 43 of the cooling apparatus 45 which operates as a trap, where it is subjected to the cooling action of the water which enters the coil 44 therein from the pipe 46 and discharges through the pipe 47 into the jacket of the compressor to prevent overheating of its cylinder 48. Condensing of a portion of the chlorine and sulphuric acid is effected in the tank 43, the acid being heavier than the liquid chlorine gravitating to the bottom of this tank and flowing with chlorine through the pipe 20 and coil 19 back to the crank case 25. The chlorine either as a gas or liquid passes from the tank 43 through the pipe 54, which preferably is located a considerable distance from the bottom of the tank 43, into the condenser 54 which completes the condensing of the chlorine gas which passes over from the cooling tank 43, the chlorine in passing through the condenser 54 being subjected to the cooling action of the oppositely flowing currents of cold water in the coil 56. The condensed chlorine and any condensed sulphuric acid content, discharge into the pipe 58, the acid settling in the chamber 68 and the liquid chlorine entering the pipe 61 from which the chlorine, which is substantially 100% pure, may be filled into the shipping containers such, for example, as the one shown at 65.

The effect of operating on the chlorine as described is to produce in the condensing apparatus beyond the compressor, liquefied chlorine at a temperature of the coil 54 of approximately 70° F. and under relatively low pressure as stated, thus permitting the liquefied chlorine to be directly charged into the shipping containers. In the filling of the containers the air is, by preference, exhausted therefrom before the filling operation begins, this exhausting operation being effected in any desired manner. The container is preferably first cooled to a point below the temperature of the condensed chlorine and then enclosed in the insulating covering 66 and thereupon the air exhausted from the container. The container is then connected with the pipe 61 and the liquid chlorine then permitted to flow into the container, this filling operation being quickly effected. The insulating of the container 65 serves to keep down the gas pressure in the coil 56 and this is further facilitated by permitting a portion of the liquid chlorine in the container 65 to evaporate by closing the valve 59 and opening valve 69. The gas thus liberated, together with the accumulations of acid in chamber 68, flows back through pipe 67 to the tower 16 and is thus not wasted. The temperature of the containers may thus be caused to be less than the temperature of the water in the condenser coil 56 so that no additional gas pressure is required for filling the containers.

The effect of causing the compressed chlorine gas and sulphuric acid to become commingled, is to render the compressed chlorine gas, condensable at such a relatively high temperature that the chlorine gas may, even though quite impure, and compressed only to the relatively low degree of substantially 100 pounds to the square inch, be condensed at relatively high temperature as for example 70° F., the temperature of ordinary water, with the manifest advantages, especially over prior practices involving the refrigeration of the compressed gas to temperatures at, or approximately at, 35° F. below zero. While I prefer to employ sulphuric acid for the purpose stated, if desired, other substances which are in liquid condition at higher temperatures than that at which pure chlorine under the same pressure condenses, may be used and the commingling of such substance and the gas, accomplished in any desired way, as also the commingling of the sulphuric acid and the gas may be effected in other ways than that described.

The feature of maintaining a pressure of chlorine gas in the crank-case is of advantage as thereby the suction action produced by the operating parts of the compressor is not exerted on the surrounding atmosphere, but is neutralized by the pressure in the crank-case and thus no air which would dilute the compressed gas, is permitted to enter the crank-case. Also the feature of expanding chlorine into low-pressure gas in the coil 18 is of advantage as it aids in keeping cool the bearings of the compressor and reduces the final pressure required in the liquefying coil 54.

The water from waste 47 may, if desired, be used in the preliminary cooler 5 where temperature conditions permit; and the trap 38 is made sufficiently deep to more than counterbalance the gas pressure in the crank-case, so that no chlorine gas can get back into the tower 13.

When the container 65 has been filled the valves 59 and 62 are closed and valve 69 opened for a moment to relieve the gas in these connections.

The pipe 34, which is preferably equipped with a gauge 34$^a$ and a valve 34$^b$, operates to equalize the pressure in the top of the chamber 30 to effect free gravity flow of the acid therefrom.

The pipe 20 is preferably equipped with a valve 20$^a$ by means of which the pressure of chlorine gas in the crank-case may be regulated.

Figure 4:
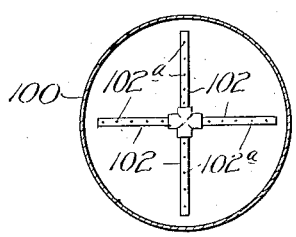

In the arrangement shown in Figs. 3 and 4, the portions of the apparatus interposed between the cooling apparatus 44 and the pipe 61$^b$ in Fig. 1, are omitted and a chlorine-gas liquefying apparatus substituted for the apparatus 44 from which the liquefied chlorine may be charged directly into the shipping containers, such as the containers 65. The liquefying apparatus referred to comprises a tank 100$^x$ having a valved vent-pipe 100$^a$ and valved drain-pipe 100$^b$, the latter for the acid, into which tank the pipe 101$^a$, corresponding to the pipe 24 and through which the compressed chlorine gas containing some of the sulphuric acid, is forced by the operation of the compressor 23, opens, this pipe extending downwardly in the tank 100$^x$ to a point closely adjacent the bottom thereof and preferably having branches 102 radiating therefrom and containing downwardly directed openings 102$^a$ along their lower sides through which the gas forced through the pipe 101$^a$, discharges into the lower portion of the tank 100$^x$ and into a body of sulphuric acid therein, and represented at 103. A coil 104 for a condensing medium is located in the tank 100$^x$, this coil being submerged in the body 103 of acid. One end of this coil is connected with a pipe 105 which corresponds to the pipe 46 (Fig. 1), and through which cooling water is supplied to the coil, as by connecting the pipe 105 with the pipe 53 of Fig. 1, the other end of the coil 104 being connected with a pipe 106 corresponding with the pipe 47 of Fig. 1, for conducting the cooling water away from the coil 104. The pipe represented at 106$^a$ corresponds with the pipe 20 of Fig. 1, and a pipe represented at 107 is provided for charging the sulphuric acid into the tank 100$^x$. In this particular apparatus, the compressed chlorine gas discharges into the body 103 of acid entering it, preferably in fine streams through the openings 102$^a$ in the branch pipes 102. In its passage upwardly through the relatively cold acid, the chlorine gas is condensed and floats on the top of the body 103 of acid, the condensed chlorine gas passing from the tank through a pipe 108 having a flexible section 109 opening into a valved coupling 110 communicating with the inlet of the shipping container 65 and carried thereby.

It will be understood that while certain particular steps and certain particular apparatus, are described and shown, I do not intend to limit the invention thereto as the same may be variously modified and altered without departing from the spirit of my invention.

Furthermore, while I have devised my invention for use more particularly in the manufacture of liquefied chlorine gas, the same may be used in the liquefaction of many other gases, such, for example, as carbon dioxid, oxygen and sulphur dioxid, and I therefore do not wish to be understood as intending to limit the invention to use in connection with the liquefaction of chlorine gas.

What I claim as new and desire to secure by Letters Patent is:

1. The method of liquefying chlorine gas which consists in compressing the gas and commingling the gas and a substance which is in liquid condition at the temperature at which chlorine gas under the same pressure begins to condense, and condensing the gas while intermixed with said substance.

2. The method of liquefying chlorine gas which consists in compressing the gas and commingling the gas and sulphuric acid and condensing the gas while intermixed with the sulphuric acid.

3. The method of liquefying chlorine gas which consists in compressing the gas in the presence of, and to commingle therewith, a substance which is in liquid condition at the temperature at which chlorine gas under the same pressure condenses, and condensing the gas while intermixed with said substance.

4. The method of liquefying chlorine gas which consists in compressing the gas in the presence of sulphuric acid in finely divided condition to be carried along by the current of gas, and condensing the gas while intermixed with the sulphuric acid.

5. The method of liquefying chlorine gas which consists in compressing the gas in a compressor, the compressing chamber of which contains sulphuric acid which commingles in finely divided condition with the gas to be carried along by the current of gas, and condensing the gas while intermixed with the sulphuric acid.

6. The method of liquefying chlorine gas which consists in compressing the gas and commingling the gas and a substance which is in liquid condition at the temperature at which chlorine gas under the same pressure begins to condense, cooling the mixture of the gas and the said substance to condense the gas, and separating the liquefied gas from the said other substance in liquid condition.

7. The method of liquefying chlorine gas which consists in compressing the gas and commingling the gas and a dehydrating liquid which is in liquid condition at the temperature at which chlorine gas under the same pressure condenses, condensing the gas while intermixed with said substance, separating said substance from the gas, and drying chlorine gas therewith.

8. The method of liquefying chlorine gas, which consists in compressing the gas and commingling the gas and sulphuric acid, condensing the gas while intermixed with the acid, separating the sulphuric acid from the gas, and drying chlorine gas with the acid so separated.

9. In the manufacture of liquefied chlorine gas, the method which consists in compressing the gas in a compressor of the closed crank-case type and maintaining gas pressure to a degree not less than atmospheric pressure, in the crank-case during the operation of the compressor, whereby suction exerted in the crank-case is relieved and the gas being compressed is undiluted by mixture with air.

10. In the manufacture of liquefied chlorine gas the method which consists in compressing the gas in a compressor of the closed crank-case type and supplying chlorine gas to the crank case during the operating of said compressor, whereby suction exerted in the crank-case is relieved by chlorine gas and the gas being compressed is undiluted by mixture with air.

11. In the manufacture of liquefied chlorine gas, the method which consists in compressing the gas in a compressor of the closed-crank-case type and supplying to the crank-case of the compressor during the operation of the latter, chlorine gas compressed by the compressor and cooled in its passage to the crank-case, whereby suction exerted in the crank-case is relieved by chlorine gas and the gas being compressed is undiluted by mixture with air.

12. In the manufacture of liquid chlorine gas, the method which consists in compressing the gas in the presence of sulphuric acid supplied to the compression chamber, and thereafter utilizing the acid in the drying of the gas before compression.

13. In the manufacture of liquid chlorine gas, the method of compressing gas which consists in compressing it in a compressor having a closed crank-case, maintaining sulphuric acid in the crank-case while compressing the gas, and cooling the acid in the crank case.

14. The method of liquefying chlorine gas which consists in compressing the gas, and condensing it in the presence of sulphuric acid with which it is commingled.

15. The method of liquefying chlorine gas which consists in compressing the gas, and condensing it in the presence of sulphuric acid with which it is commingled and separating the liquid chlorine from the acid.

16. The method of liquefying chlorine gas which consists in compressing the gas, and condensing it in the presence of a substance which is in liquid condition at the temperature at which chlorine gas under the same pressure begins to condense, and with which substance the gas is commingled.

17. In the manufacture of liquefied chlorine gas, the method which consists in compressing the gas in the presence of sulphuric acid, cooling the gas containing the acid, and thereafter separating the sulphuric acid and a portion of the compressed gas from the main body of compressed gas and employing the separated sulphuric acid and the chlorine commingled therewith and in cool condition, in the cooling of other chlorine gas prior to the compressing of the latter.

18. In the manufacture of liquefied chlorine gas, the method which consists in compressing gas in the presence of sulphuric acid, cooling the gas containing the acid, and thereafter separating the sulphuric acid and a portion of the compressed gas from the main body of the compressed gas and introducing the separated sulphuric acid and the chlorine commingled therewith into the main body of the chlorine gas prior to the compressing of the latter.

19. In the manufacture of liquefied chlorine gas, the method which comprises compressing chlorine gas, condensing the compressed gas, delivering the condensed gas to a container for the liquid gas, releasing from said container in gaseous form a portion of the chlorine introduced therein, and thereafter re-compressing such released chlorine gas.

20. In the manufacture of liquefied chlorine gas, the method which comprises drying the chlorine gas, compressing the gas, condensing the compressed gas, delivering the condensed gas to a container for the liquefied gas, releasing from said container in gaseous form a portion of the chlorine introduced therein, thereafter expanding the released chlorine gas and re-compressing such released chlorine gas.

21. In the manufacture of liquefied chlorine gas, the method which comprises compressing the gas, cooling it prior to compressing it by contacting it with expanding chlorine gas previously compressed, and re-compressing, in commingled condition, the expanded chlorine gas and the gas cooled thereby.

22. In the manufacture of liquefied chlorine gas, the method which comprises compressing the gas in a compressor of the closed crank-case type and supplying chlorine gas under pressure to the crank-case during the operating of said compressor, whereby suction exerted in the crank-case is relieved by chlorine gas and the gas being compressed is undiluted by mixture with air.

23. In the manufacture of liquefied chlorine gas, the method which comprises compressing the gas in a compressor of the closed crank-case type and supplying chlorine gas under pressure to the crank-case of the compressor during the operation of the latter, and cooling the gas in its passage to the compresser by subjecting it to the cooling action of the gas supplied to the crank-case, whereby suction exerted in the crank-case is relieved by chlorine gas and the gas being compressed is undiluted by mixture with air.

24. In the manufacture of liquefied chlorine gas, the method which comprises compressing the gas in a compressor of the closed crank-case type and supplying chlorine gas under pressure to the crank-case of the compressor during the operation of the latter, and in its passage to the crank-case permitting it to expand, and cooling the gas in its passage to the compressor by subjecting it to the cooling action of the expanding gas in the passage of the latter to the crank-case, whereby suction exerted in the crank-case is relieved by chlorine gas and the gas being compressed is undiluted by mixture with air.

25. The method of liquefying gas chemically inert to sulphuric acid which consists in compressing the gas in the presence of sulphuric acid in sufficiently finely divided condition to be carried along by the current of gas and condensing the gas while intermixed with the sulphuric acid.

26. In the manufacture of liquefied gas chemically inert to sulphuric acid, the method which consists in compressing the gas in the presence of sulphuric acid supplied to the compression chamber, and thereafter utilizing the acid in the drying of the gas before compression.

27. In the manufacture of liquefied gas chemically inert to sulphuric acid, the method of compressing the gas which consists in compressing it in a compressor having a closed crank-case, maintaining sulphuric acid in the crank-case while compressing the gas, and cooling the acid in the crank-case.

28. The method of liquefying gas inert to sulphuric acid which consists in compressing the gas, and condensing it in the presence of sulphuric acid with which it is commingled.

29. The method of liquefying gas which consists in compressing the gas, and condensing it in the presence of a substance which is in liquid condition at the temperature at which the gas under the same pressure begins to condense, and with which the substance is commingled.

30. In the manufacture of liquefied gas chemically inert to sulphuric acid, the method which consists in compressing the gas in the presence of sulphuric acid, cooling the gas containing the acid, and thereafter separating the sulphuric acid and a portion of the compressed gas from the main body of compressed gas and employing the separated sulphuric acid and the gas commingled therewith and in cool condition, in the cooling of other gas prior to the compressing of the latter.

31. The method of liquefying a gas chemically inert to sulphuric acid, which consists in compressing the gas and commingling the gas and a substance which is inert to the gas and which is in liquid condition at the temperature at which the gas under the same pressure begins to condense, and condensing the gas while intermixed with said substance.

WILLIAM M. JEWELL.